United States Patent [19]
Morikawa et al.

[11] Patent Number: 5,991,246
[45] Date of Patent: Nov. 23, 1999

[54] DEVICE FOR CARRYING A DISC PLAYER IN AN AUTOMATIC DISC CHANGER

[75] Inventors: Kiyoshi Morikawa; Yoshihumi Nakayama; Jun Togashi; Hiroshi Akiyama; Nobuo Ishida; Tomomichi Kimura; Tatsuya Yanagisawa; Takashi Ota, all of Saitama-ken, Japan

[73] Assignee: Pioneer Electronic Corporation, Tokyo, Japan

[21] Appl. No.: 08/886,413

[22] Filed: Jul. 1, 1997

[30] Foreign Application Priority Data

Jul. 4, 1996 [JP] Japan ................................. 8-193888
Jun. 27, 1997 [JP] Japan ................................. 9-171560

[51] Int. Cl.[6] .................................................. G11B 17/22
[52] U.S. Cl. ............................... 369/35; 369/36; 369/178
[58] Field of Search .......................... 369/178, 34, 35, 369/36, 191, 194; 414/277, 280; 360/92

[56] References Cited

U.S. PATENT DOCUMENTS 5,006,940  4/1991  Hamachi et al. ........................ 360/92
5,084,854  1/1992  Ikedo et al. ............................ 369/75.1
5,682,363  10/1997 Tsuchiya et al. ........................ 369/36
5,717,681  2/1998  Osada .................................... 369/178

FOREIGN PATENT DOCUMENTS

330 731 A2  9/1989  European Pat. Off. .
671 736 A1  9/1995  European Pat. Off. .

*Primary Examiner*—William J. Klimowicz
*Attorney, Agent, or Firm*—Nikaido, Marmelstein, Murray & Oram LLP

[57] ABSTRACT

A casing of a device has a pair of vertical side walls, and a plurality of vertically arranged optical discs. Each side wall has a vertical guide slit. A disc player has two pins projected from opposite sides. Elevation plates are horizontally slidably mounted on the vertical side walls at outsides thereof. Each of the elevation plates has a V-shaped guide slit comprising an upper diagonal slit and a lower diagonal slit. Each pin is slidably engaged with vertical guide slit and with the V-shaped guide slit so that disc player is held at a vertical position. The elevation plates are driven in a horizontal direction which is changed to an opposite direction at a joint between the upper diagonal slit and the lower diagonal slit. Thus, each of the pins is moved along the vertical guide slit and the V-shaped guide slit, so that the disc player is carried to a position corresponding an optical disc.

26 Claims, 11 Drawing Sheets

DEVICE FOR CARRYING A DISC PLAYER IN AN AUTOMATIC DISC CHANGER

BACKGROUND OF THE INVENTION:

The present invention relates to an automatic disc changer having a disc player and a plurality of recording mediums such as optical discs stored therein so that the discs are automatically reproduced. More particularly, the invention relates to a carrier for transporting the disc player to a position for playing a desired disc.

There is known an automatic disc changer wherein a plurality of CDs are stored, and a desired CD is automatically taken out and transported to a disc player to be reproduced.

Figure 12:
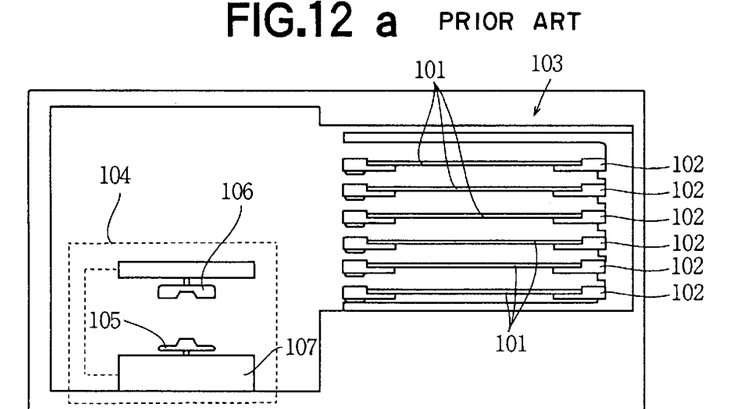
FIGS. 12a to 12c are schematic elevational views of a conventional automatic disc changer in operation.

Referring to FIGS. 12a to 12c, an example of a conventional automatic disc changer has a disc storing section 103 wherein a magazine (not shown) holding a plurality of CDs 101, six in the present case, is disposed. The magazine has a plurality of horizontal trays 102, in each of which is disposed one CD, aligned in the vertical direction at a predetermined interval. A disc player 104 is provided adjacent the storing section 103 so that one of the CDs 101 can be pulled out of the magazine and carried to the disc player 104.

The disc player 104 comprises a turntable 105 mounted on a chassis 107 for rotating the CD 101, and a damper 106 for clamping the CD 101 on the turntable 105 during reproduction.

When a select switch (not shown) is operated to play one of the CDs 101, the disc player 104 is vertically moved along the alignment of the CDs 101 from the position shown in FIG. 12a to a position shown in FIG. 12b where the tray 102 holding a selected CD 101 is stored. A tray drawing device (not shown) in the disc player 104 draws out the designated tray 102 and carries the tray to a playing position between the turntable 105 and the clamper 106, as shown in FIG. 12b. The turntable 105 and the damper 106, in cooperation, hold the CD 101 therebetween so that the CD 101 is released from the tray 102 as shown in FIG. 12c. Hence the CD 101 is rotated by the operation of a motor (not shown) of the disc player 104 and a pickup (not shown) reproduces the information recorded on the CD.

Figure 13:
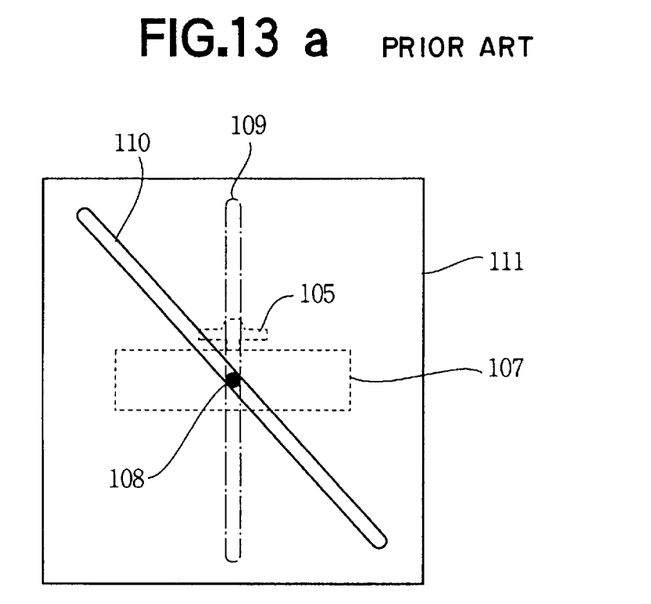

The disc player 104 is thus provided with a carrier means for vertically moving the player, which is shown in FIGS. 13a and 13b. As shown in FIGS. 13a and 13b, vertical grooves 109 are formed in opposite side walls 112 of a casing of the disc changer. A pair of horizontally slideable plates 111 each having a diagonal groove 110 are disposed against the opposite side walls 112 of the casing so that the diagonal groove 110 and the vertical groove 109 cross each other. A chassis 107, which supports the turntable 105, is provided with a pair of pins 108 projecting sideways from the opposite sides of the chassis as shown in FIG. 13b. Each pin 108 engages the vertical groove 109 of the wall 112 and the diagonal groove 110 of the slidable plate 111 at the crossing of the grooves, so that the chassis 107 is held between the two opposite walls 112 of the casing.

When the slidable plates 111 simultaneously slide horizontally in the lateral direction thereof in accordance with the operation of a driving means (not shown), the pins 108 in the diagonal grooves 110 ascend or descend along the grooves 109 and 110. Thus, the chassis 107 supported by the pins 108 is vertically elevated or lowered. Although not specifically shown in the figures, a controller is provided to control the operation of the driving means. The disc player 4 is stopped at an appropriate position confronting the tray 102 with the selected CD 101.

Hence in the conventional disc changer, the disc player 104 is moved in the aligning direction of the CDs 101 and stopped at the desired position facing the tray 102 having the selected CD 101. The tray 102 is then drawn out and set in the disc player 104 to play the CD 101.

It is advantageous to the user of such a disc changer to increase the number of the CDs to be stored therein, because the trouble of exchanging the CDs is reduced. In order to increase the number of CDs 101, the volume of the magazine must be increased. As a result, the length of the alignment of the CDs is increased, inevitably increasing the traveling distance of the disc player 104.

Namely, a longer diagonal groove 110 must be formed in each slidable plate 111, rendering the sliding distance of the slidable plates longer. Accordingly, the size of the entire disc changer is enlarged so that the place where the disc changer can be disposed becomes restricted. Particularly in the case of an automotive disc changer, it is difficult to secure a sufficiently large space for the disc changer in a limited space of a vehicle.

SUMMARY OF THE INVENTION

An object of the present invention is to provide a disc player carrier which enables the manufacture of an automatic disc changer where the number of the recording media is increased without largely increasing the size of the disc changer.

According to the present invention, there is provided a device for carrying a player having a plurality of recording media, wherein carrying means is provided for carrying the player in a first direction which is the same as the medium arranging direction. Driving means are provided for moving the carrying means in a second direction which is perpendicular to the first direction, the carrying means has at least one guide which has an appropriate V-shape with respect to the first direction and is engaged with the driving means for guiding the player in the first direction, the player can be moved to a disposed position of a selected recording medium by moving the guide in a predetermined range along the second direction depending upon the engaging position of the guide and the player.

When an engaging portion of the player engaging with the guide relatively moves over a joint of the V-shaped guide, the moving direction of the guide after the joint is opposite to the moving direction of the guide before the joint.

A siding is provided, which is continuously branched from the joint and has a range with which the engaging portion of the player can be engaged.

Changing means is provided corresponding to the siding and the guide, the changing means is adapted to temporarily induce the engaging portion of the player into the siding when moving the engaging portion over the joint of the V-shape.

The guide is provided in plural, the engaging portion engages with each guide, the sidings have reset region for moving the engaging portions to a desired direction of the guide in a same inducing direction.

The carrying means is composed by a plate, the guide is a guide slit formed in the plate, the engaging portion of the player, engaged with the slit is an engaging pin.

The siding is a siding slit continuously branched from the joint of the guide slit, and having a region with which the engaging pin can be engaged.

The changing means is a means for inducing the engaging pin into the siding slit by engaging with the pin when the engaging pin is located in the guide slit and the carrying means moves. The changing means also causes the engaging pin to enter the guide slit and moving along the guide slit by the carrying means moving so as to cause the pin to approach the joint of the guide slit when the engaging pin is in the siding slit.

The changing means has a changeover lever provided adjacent the joint of the guide slit, along the first direction, which is rotatably composed in a range between a first engaging position and a second engaging position. A control lever is rotatable at a predetermined position adjacent the siding slit and resiliently held at a position near an end thereof. An actuating lever is engaged with a position near an end of the changeover lever with a play. The changeover lever, when the engaging pin is positioned in the guide slit and the carrying means moves, is rotated by the pushing of the engaging pin, and engages the changeover lever at the first position or the second position, thereby inducing the engaging pin into the siding slit. The control lever, when the engaging pin is positioned in the siding slit and when the carrying means moves so as to cause the engaging pin to approach the joint of the guide slit corresponding the siding slit, is rotated by the pushing of the engaging pin, and engages the changeover lever at the first position or the second position, thereby inducing the engaging pin into a half part of the guide slit or another half part bordering the joint, cooperating with the actuating lever.

The control lever has a cam which is configured such that when the engaging pin contacts with the cam in a changing region of the siding slit, by the operation that the carrying means moves to cause the engaging pin to approach the joint corresponding to the siding slit, the control lever is rotated by the pushing of the engaging pin, thereby engaging the changeover lever at the first position or the second position, cooperating with the actuating lever mounted on the control lever.

Detecting means is provided for detecting the fact that the engaging portion of the player is positioned near the joint of the V-shape when the engaging portion of the guide relatively move over the joint, the moving direction of the guide is changed by the detecting means.

These and other objects and features of the present invention will become more apparent from the following detailed description with reference to the accompanying drawings.

BRIEF DESCRIPTION OF THE DRAWINGS

FIG. 13a is an elevational view of a conventional carrier means for moving a disc player provided in the automatic disc changer of FIGS. 12a to 12c; and FIG. 13b is an exploded perspective view of the carrier means of FIG. 13a.

DETAILED DESCRIPTION OF THE PREFERRED EMBODIMENT

Figure 1:
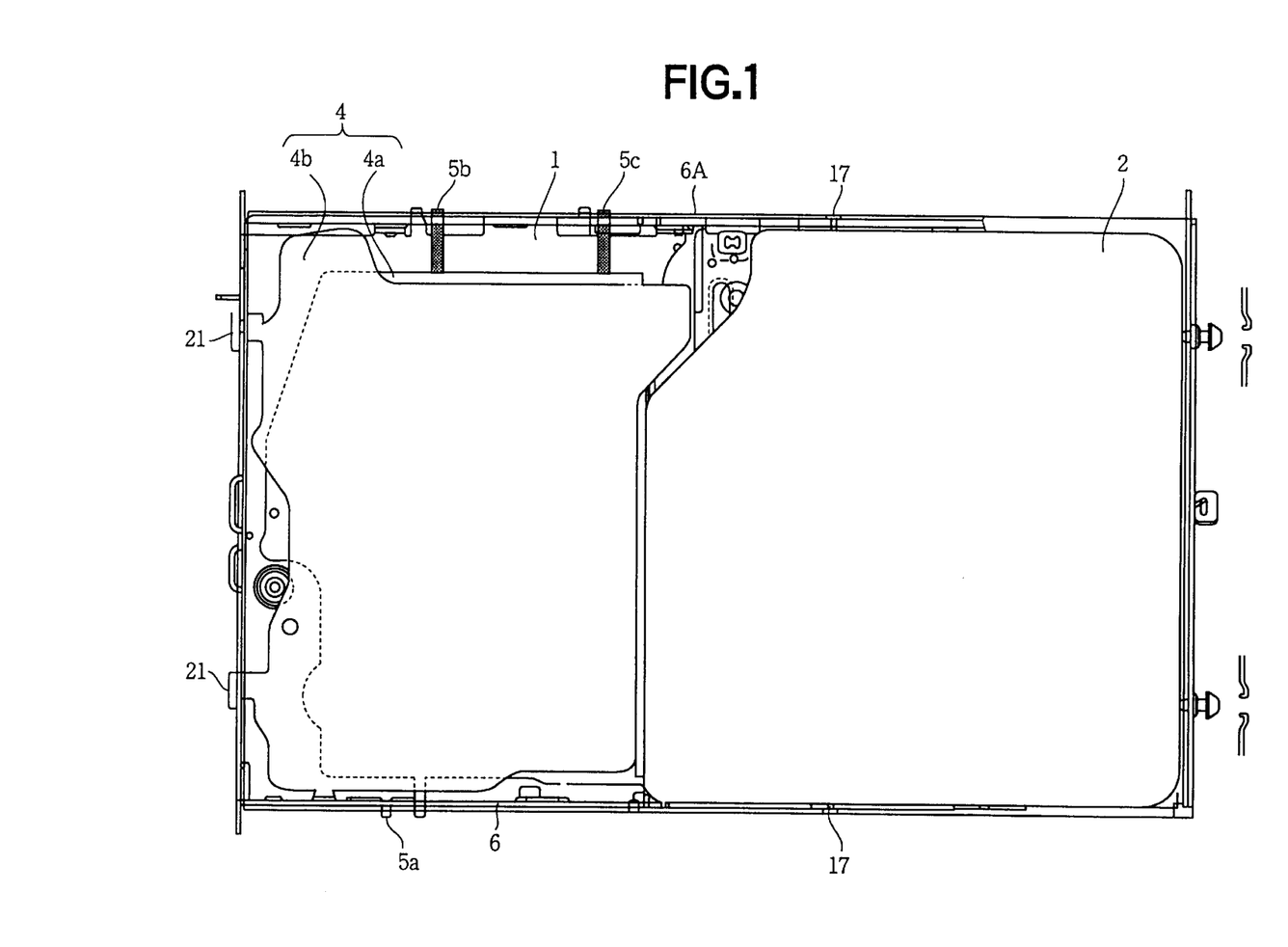
FIG. 1 is a schematic plan view of an automatic CD changer according to the present invention.
Figure 2:
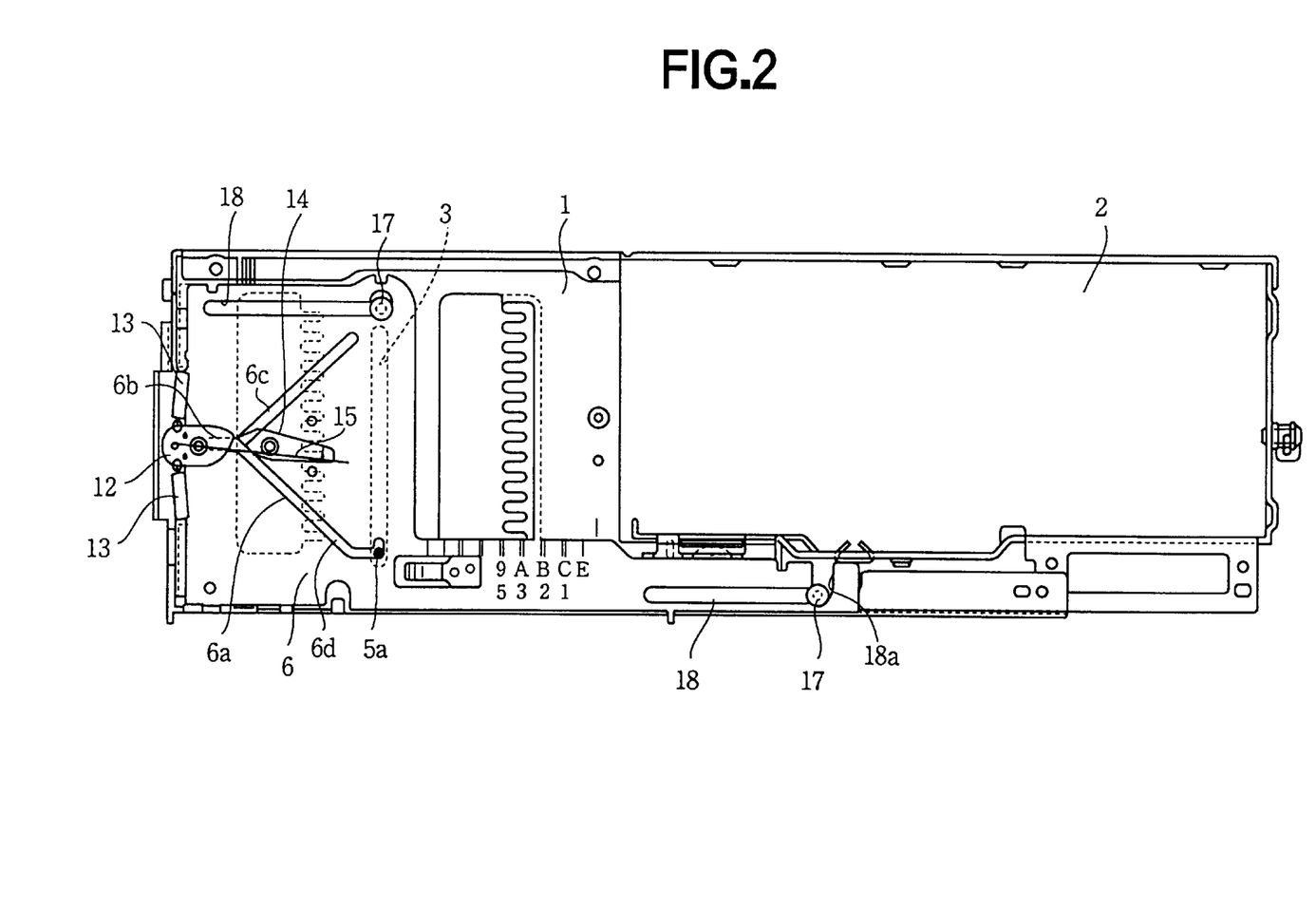
FIG. 2 is an elevational view of the automatic CD changer of FIG. 1.

Referring to FIGS. 1 to 4, an automotive CD changer according to the present invention has a casing 1 with a pair of vertical side walls, and a bottom plate. In the casing is disposed a disc player 4 comprising a reproducing device 4a and a clamping device 4b shown in FIG. 4. A chassis comprising the reproducing device 4a has pins 5a, 5b and 5c projected at the front and the rear sides thereof. Namely as shown in FIG. 1, one pin 5a is formed at the front, and two pins 5b and 5c at the back. Each of the pins (hereinafter called merely pin 5) slidably engages with a corresponding vertical guide slit 3 formed in the vertical opposite side walls of the casing 1 as shown in FIG. 2.

Figure 5:
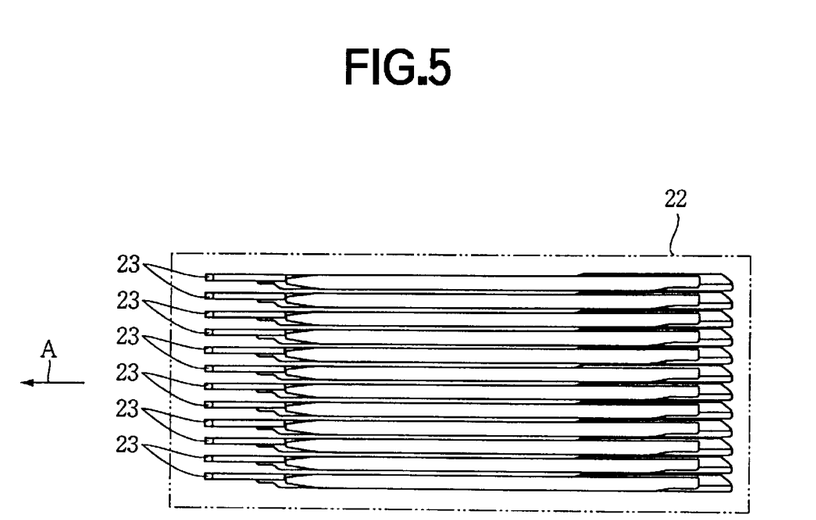
FIG. 5 is an elevational view of a magazine provided in the automatic CD changer, showing the inner structure thereof.

The blank space in the casing 1 adjacent the disc player 4 defines a storage section 2 in which a magazine 22 (FIG. 5) is removably stored. The magazine 22 has a plurality of vertically aligned trays 23 each for holding a CD. Trays 23, the number of which is twelve in the present case, are horizontally disposed at a predetermined interval in the vertical direction. The disc player 4 is provided with arms (not shown) for pulling out one of the trays 23 from the magazine 22 in a direction A in FIG. 5. The drawn out tray 23 is carried in the opposite direction to return to the magazine 22.

Although not shown in the figures, the reproducing device 4a of the disc player comprises a turntable mounted on the chassis, a spindle motor for driving the turntable, and a pickup for reading out information recorded on the CD mounted on the turntable. The clamping device 4b has a damper coaxially disposed with the turntable of the reproducing device 4a. The damper is held substantially in parallel to the turntable at a predetermined distance therefrom, so as to allow the tray 23 to enter the space between the damper and the turntable. When playing a CD, the damper is moved toward the turntable to clamp the CD between the damper and the turntable.

Figure 4:
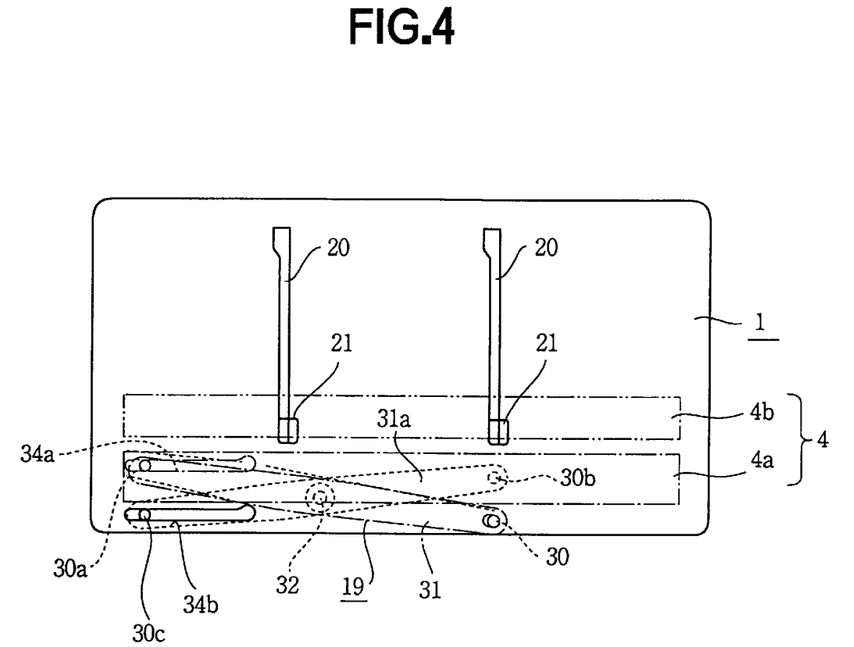
FIG. 4 is a side elevational view of the automatic CD changer as seen from the left side in FIG. 1.

Referring to FIG. 4, in order to vertically move the reproducing device 4a and the clamping device 4b, while keeping both devices in the horizontal disposition, the disc player 4 is mounted in the casing 1 by a horizontal support 19 connected to the reproducing device 4a and the casing 1. More particularly, the horizontal support 19 comprises a pair of bars 31 and 31a rotatably attached to each other by a pivot 32 at the center thereof. One end, namely the front end of the bar 31, is securely attached to the casing 1 by a pin 30. The other end is slidably engaged with a horizontal groove 34a formed in the reproducing device 4a by way of a pin 30a. The front end of the other bar 31a is pivotally attached to the reproducing device 4a by a pin 30b, and the other end is slidably engaged by way of a pin 30c with a horizontal groove 34b formed in the casing 1. The reproducing device 4a can therefore be vertically moved while maintaining the device in a horizontal orientation.

The casing 1 is further provided with a pair of vertical grooves 20. A pair of hooks 21 mounted on a side wall of the clamping device 4b slidably engage the vertical grooves 20. As a result, the damper device 4b is also held in the horizontal orientation when moved along with the reproducing device 4a. The means for horizontally supporting the disc player 4 may be formed of other known constructions.

Figure 6:
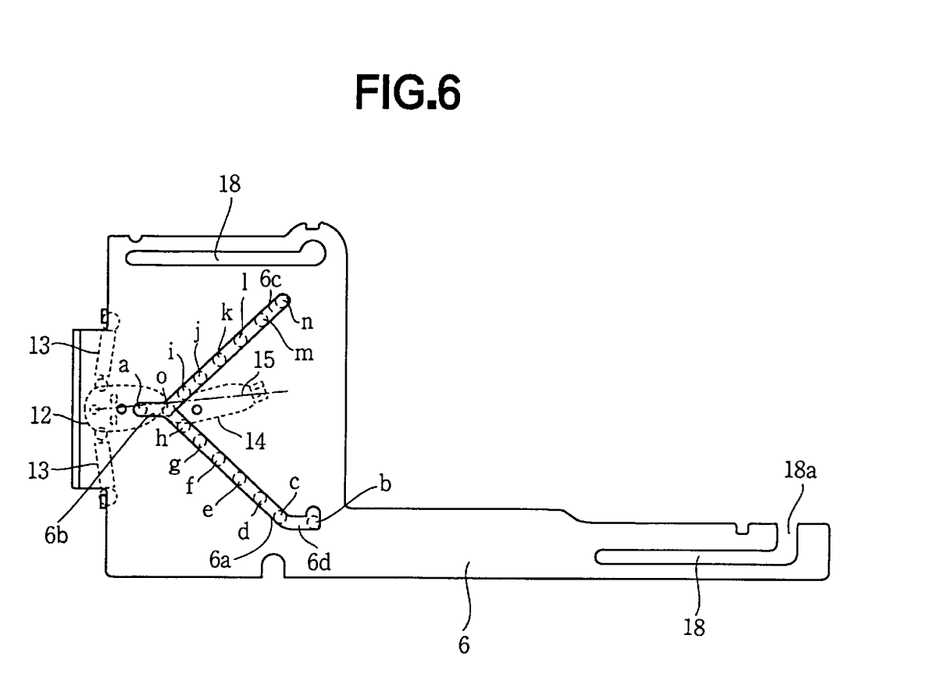
FIG. 6 is an elevational view of an elevation plate of a carrier for moving a disc player provided in the automatic CD changer of FIG. 1.
Figure 7:
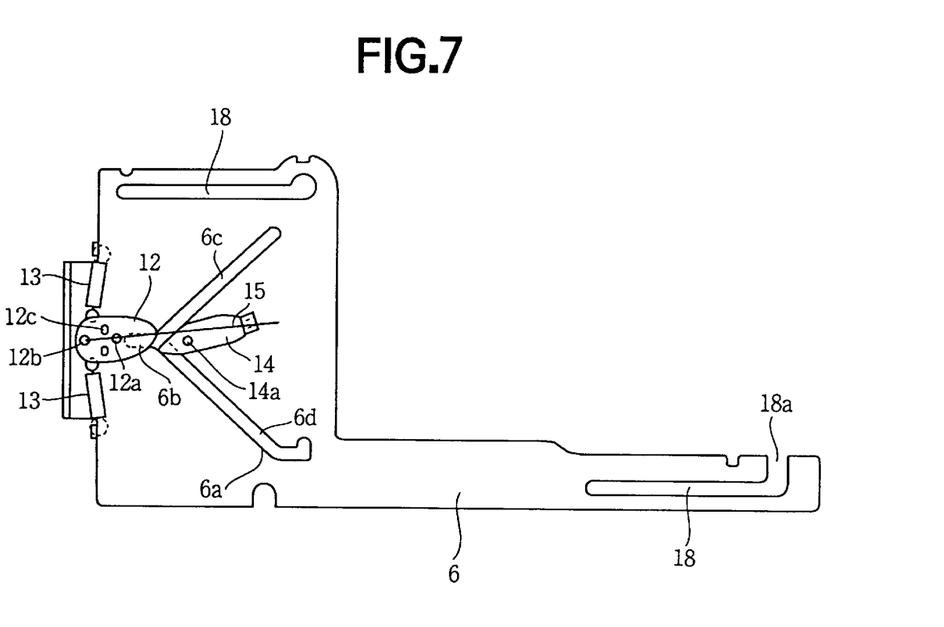
FIG. 7 is an elevational view of the elevation plate showing a changeover device provided thereon.

Referring again to FIGS. 1 and 2, a pair of L-shaped elevation plates 6 and 6A as a carrier are provided for vertically moving the disc player 4. Each of the elevation plates is horizontally slidably mounted on the vertical side wall of the casing at the outside thereof. The elevation plates 6 and 6A are adapted to be simultaneously slid in opposite directions on the casing 1. The elevation plates 6 and 6A are, for example, metal planar plates formed by pressing. FIGS. 2, 6 and 7 show the elevation plate 6 provided at the front.

Figure 11:
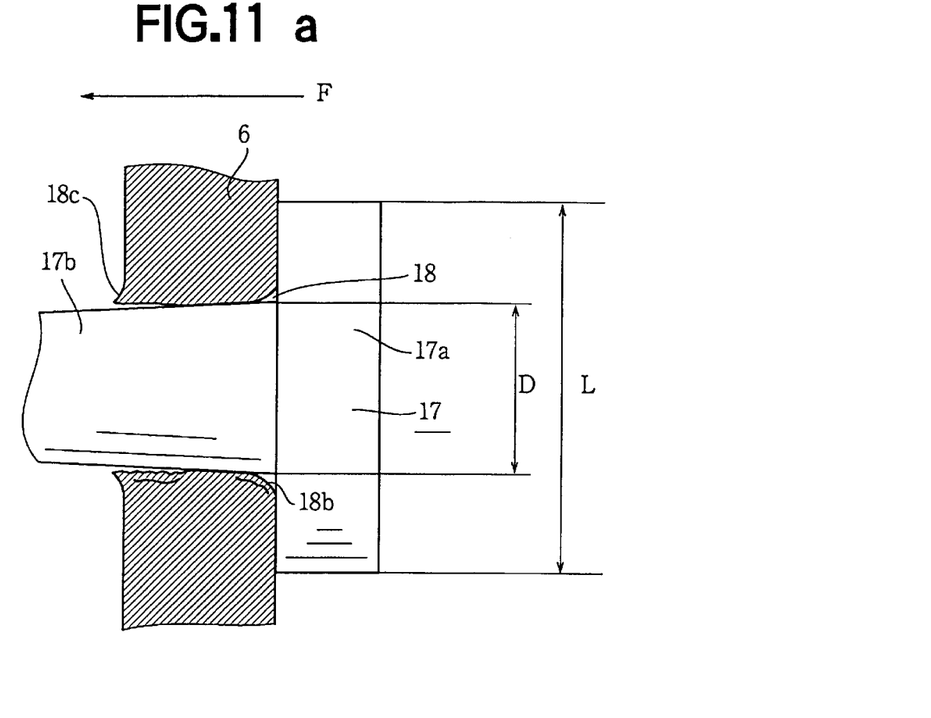
FIGS. 11a and 11b are sectional views of examples of a pin inserted in a groove formed in the elevation plate of FIG. 6.

Referring to FIG. 2, the elevation plate 6 has horizontal upper and lower slits 18. A pin 17 securely attached to the casing 1 is slidably engaged in each of the slits 18. As shown in FIG. 11a, each pin 17 has a head 17a, the diameter L of which is larger than the width D of the slit 18 so that the pin 17 can securely slide in the slit 18 without falling out. In order to allow the pin 17 with the large head 17a to be inserted in the slit 18, an opening 18a having a large width is formed at an end portion of the lower slit 18. Thus, the pin 17 is inserted in the opening 18a and slid into the slit 18. Similarly, the upper slit 18 has a large diameter portion at one end thereof.

FIG. 11a shows the pin 17 engaged with the slit 18. In the present embodiment, the slits 18 are formed by blanking during the pressing operation. When the material is pressed in a direction F, there are formed a shear droop 18b, a fracture surface, and a burr 18c on the wall of the slit 18. If the head 17a of the pin 17 is disposed to contact the wall having the burr 18c, the pin 17 cannot slide smoothly, and in addition, operation noise caused by the friction is generated. On the other hand, when the pin 17 is disposed so that the head 17a thereof contacts the wall having the shear droop 18b, the pin can smoothly slide in the slit 18, thereby preventing the noise. Moreover, as shown in FIG. 11a, a shaft 17b of the pin 17 is slightly tapered, so that there is formed a small gap between the shaft 17b and the burr 18c, or the fracture surface, thereby ensuring a smooth noiseless sliding. The pin 17 is alternatively provided with a large diameter portion 17c between the head 17a and the shaft 17b as shown in FIG. 11b to obtain the same effect.

Referring again to FIG. 2, the elevation plate 6 has a V-shaped guide slit 6a, the axis of axial symmetry of the V-shape is horizontally disposed, so that the V-shaped guide slit comprises an upper diagonal slit 6c, lower diagonal slit 6d, and a horizontal siding slit 6b at the joint of the upper and lower slits 6c and 6d. The pin 5 engaged with the vertical slit 3 of the casing 1 is inserted in the guide slit 6a. A changeover device comprising a control lever 12, a pair of springs 13, changeover lever 14 and an actuating lever 15, which will be described later in detail, is provided adjacent the siding slit 6b of the guide slit 6a. The guide slit 6a may be a recess formed on the inner wall of the elevation plate 6.

The elevation plate 6A provided at the back of the casing 1 has a similar construction to the lever 6 shown in FIG. 2 except that there are formed two guide slits, with which two pins 5 are engaged. Each slit is provided with the changeover device, and the diagonal slits are directed in the opposite directions from those of the front elevation plate 6.

Figure 3:
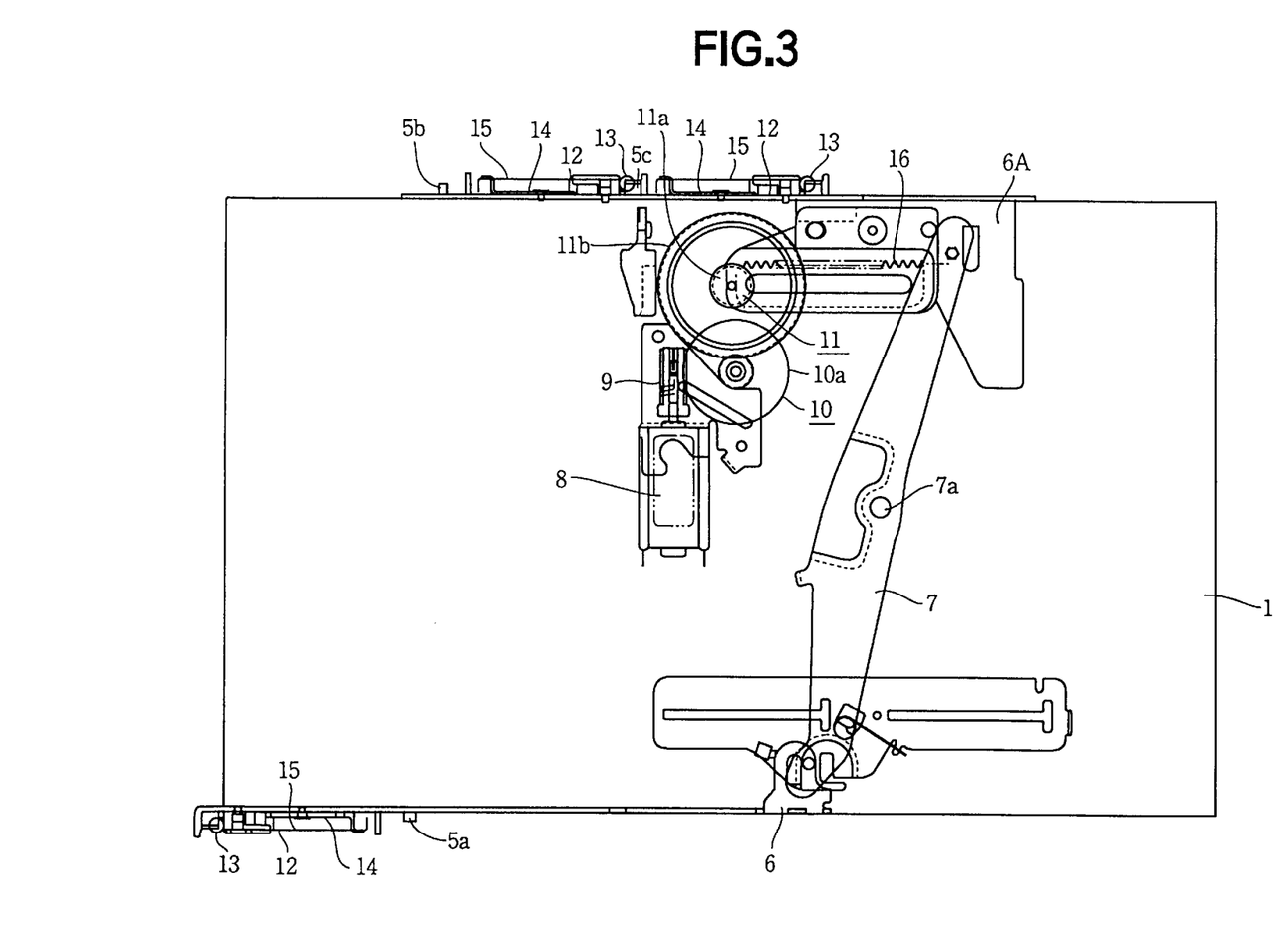
FIG. 3 is a plan view showing a bottom of the automatic CD changer of FIG. 1.

Referring to FIG. 3, the elevation plates 6 and 6A are connected to each other by a swinging lever 7 rotatably mounted on the bottom of the casing 1 about a pivot 7a. The rear elevation plate 6A is provided with a longitudinal rack 16 which engages with a pinion 1a securely mounted on a gear 11 rotatably mounted on the casing 1. Teeth 11b of the gear 11 engage with a pinion 10a securely mounted on a worm wheel 10, which engages with a worm 9. The worm 9 is securely mounted on an output shaft of a loading motor 8 fixed in the casing 1.

When the loading motor 8 is driven, power is transmitted through the worm 9, gear 10, pinion 10a, gear 11, pinion 11a and the rack 16 to move the rear elevation plate 6A in the longitudinal direction of the casing 1. The swinging lever 7 is accordingly pivoted about the pivot 7a, thereby longitudinally moving the front elevation plate 6 in the opposite direction. Accordingly, the pins 5 of the reproducing device 4a simultaneously move in the respective slanting guide slits 6a of the elevation plates 6 and 6A and in the vertical slits 3 of the casing 1. Thus the disc player 4 can be vertically transported.

Figure 8:
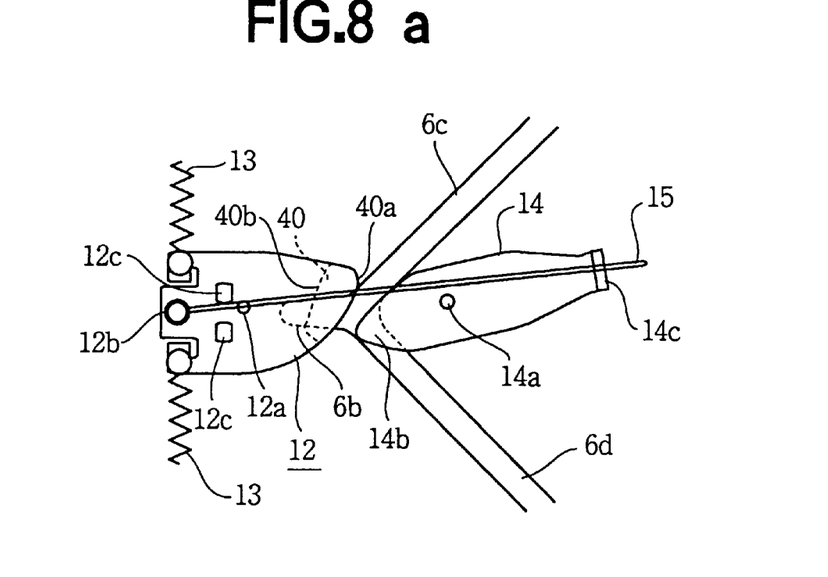
FIGS. 8a and 8b are illustrations explaining the operation of the changeover device of FIG. 7.

The changeover device of the elevation plates 6 and 6A will be described in detail with reference to FIGS. 8a and 8b. The control lever 12, rotatably mounted on the elevation plate 6 or 6A about a pivot 12a, is resiliently supported by a pair of springs 13 attached to the elevation plate. Thus the control lever 12 is held at a predetermined angular disposition relative to the elevation plate. Although the springs 13 in the present embodiment are tension springs, other types of resilient members may be used.

At one end of the control lever 12, there is formed a shaft 12b where an end of the actuating lever 15 is connected. An upper and lower stoppers 12c are provided on the control lever 12, thereby restricting the movement of the actuating lever 15 in an area between the stoppers 12c. On the underside of the control lever 12 at the end opposite to the shaft 12b, a cam 40 having a front cam surface 40a and a rear cam surface 40b is formed integral therewith. The pin 5 in the siding slit 6b abuts against the cam 40 thereby rotating the control lever 12.

The changeover lever 14 is rotatably mounted on the elevation plate 6 or 6A about a pivot 14a which is positioned on an extension of a line connecting the shaft 12b and the siding slit 6b of the guide slit 6a. A tip end 14b of the changeover lever 14 is disposed adjacent the joint of the upper and lower slits 6c and 6d, and is adapted to close the entrance to the upper slit 6c as shown in FIG. 8b, or the entrance to lower slit 6d as shown in FIG. 8a, dependent on the angular disposition of the lever 14. A projection having a hole is formed at the opposite end 14c. An end of the actuating lever 15 is loosely engaged in the hole. The actuating lever 15 in the present embodiment is a flexible wire.

When the control lever 12 is rotated about the pivot 12a due to the pin 5 engaging the cam 40, one of the stoppers 12c abuts on the actuating lever 15 and pushes it to rotate a predetermined angle about the shaft 12b. The changeover lever 14 is hence caused to rotate about the pivot 14a so as to take the position shown in either one of FIGS. 8a and 8b. When the pin 5 is released from the cam 40, the control lever 12 returns to the initial position by the springs 13.

The operation of the automatic CD changer is described hereinafter.

FIG. 6 shows various positions of the pin 5 in the guide slit 6a. Namely, positions c to h in the lower diagonal slit 6d correspond to positions of the twelfth tray, that is the bottom tray, to seventh tray 23, and the positions i to n in the upper diagonal slit 6c correspond to the positions of the sixth to the first trays 23, respectively. When the pin 5 is in a position b, as in FIG. 2, the magazine 22 can be ejected out of the disc changer. A position a at the innermost position of the siding slit 6b is a reset position and a position o at the entrance of the siding slit 6b is a changeover position.

When the magazine 22 is not inserted in the storage section 2 of the disc changer, the disc player 4 is at a position confronting the eighth tray 23. Namely the pin 5 is at a position g shown in FIG. 6. When the insertion of the magazine 22 in the storage section 2 is completed, the loading motor 8 is driven in accordance with a command from the controller. Hence the front elevation plate 6 slides to the left and the rear elevation plate 6A slides to the right in FIG. 1. The pins of the disc player 4 hence slide downwardly along the lower diagonal slits 6d of the guide slits 6a to the positions c, that is the position where the disc player 4 confronts the twelfth tray 23. Since each pin 5 is also engaged with the vertical slit 3, the disc player 4 descends vertically. The disc player 4 then pulls out the twelfth tray 23 in order to detect a CD in the tray. Information on the existence or nonexistence of the CD is stored in a memory (not shown). The elevation plate 6 is further moved so that the pins are at positions d, thereby to detect the CD in the eleventh tray 23. The same procedure is repeated until all of the trays 23 are checked. The disc player 4 is positioned at the upper most position n to wait a command for selecting one of the trays 23.

When the user selects a desired CD, the controller operates the loading motor 8. The disc player 4 hence descends so as to face the tray 23 with a desired CD. The arms of the disc player 4 hold the tray 23 and draws it horizontally out of the magazine 22 and into the space between the reproducing device 4a and the damper device 4b. The loading motor 8 is further operated to slightly heave the disc player 4, thereby separating the CD on the turntable from the tray. At the same time, the damper device 4b is lowered toward the reproducing device 4a so that the CD on the tray 23 is held between the damper device 4b and the turntable of the reproducing device 4a. The turntable is driven by the spindle motor provided in the reproducing device 4a and the pickup thereof reads out the information on the CD.

The operation of the disc player carrier for vertically moving the disc player is described in detail with reference to FIGS. 8a and 8b, FIGS. 9a to 9d, and FIGS. 10a to 10d, each figure showing the pin 5 engaged with the front elevation plate 6.

Figure 9:
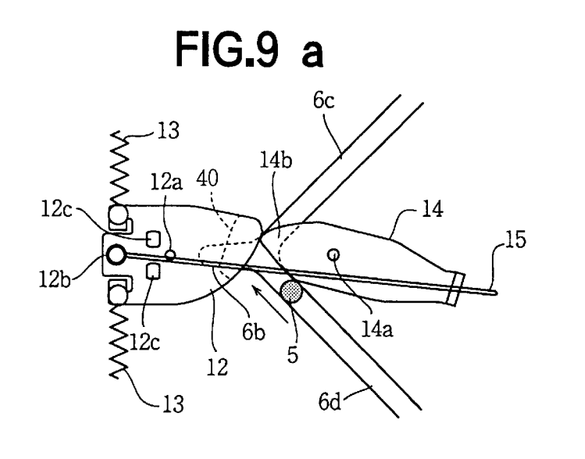
FIGS. 9a to 9d are illustrations showing the operation of the changeover device when the disc player is elevated.

FIGS. 9a to 9d show the movement of the pin 5 when the disc player 4 is ascended from the position of the twelfth tray to that of the first tray. As shown in FIG. 9a, as the elevation plate 6 slides toward the right, the pin 5 climbs along the lower diagonal slit 6d of the guide slit 6a towards the junction of the diagonal slits 6c and 6d. The pin 5 abuts on the lower side wall of the changeover lever 14 so that the tip end 14b thereof is rotated upward to the position shown in FIG. 8b, thereby closing the passage to the upper slit 6c. As the elevation plate 6 is further moved to the right, the pin 5 slides on the underside of the changeover arm 14, and abuts against the cam 40 of the control lever 12 as shown in FIG. 9b, and pushes the front cam surface 40a, thereby rotating the control lever 12 in the counterclockwise direction as shown in FIG. 9c. Thus the pin 5 is allowed to enter the siding slit 6b at the position o in FIG. 6. With the rotation of the control lever 12, the actuating lever 15 is rotated in the counterclockwise direction by the lower stopper 12c about the shaft 12b. The changeover lever 14 is hence rotated in the counterclockwise direction about the pivot 14a, causing the end 14b of the changeover lever 14 to move downward. Hence the passage to the upper slit 6c is opened as shown in FIGS. 8a and 9c.

The loading motor 8 is thereafter driven in the opposite direction so that the elevation plate slides toward the left in FIG. 2. The pin 5 accordingly slides up the upper slit 6c as shown in FIG. 9d to the desired position n, thereby elevating the disc player 4 to confront the first tray 23. The control lever 12 returns to the initial position thereof by the urging of the springs 13 when the pin 5 is released from the cam 40. The upper stopper 12c pushes the actuating lever 15 to rotate it in the clockwise direction. Thus each member returns to a position similar to the position of FIG. 8a where the control arm 12 is at the neutral position.

The elevation plates 6 and 6A thus reciprocate the distance corresponding to the length between the positions c and o to carry the disc player 4 at the desired position.

When lowering the disc player 4, the pins 5 slide from the upper diagonal slit 6c into the siding slit 6b, and with the change of the moving directions of the elevation plates 6 and 6A, slide in the lower diagonal slit 6d in the similar manner to the ascending of the disc player.

Figure 10:
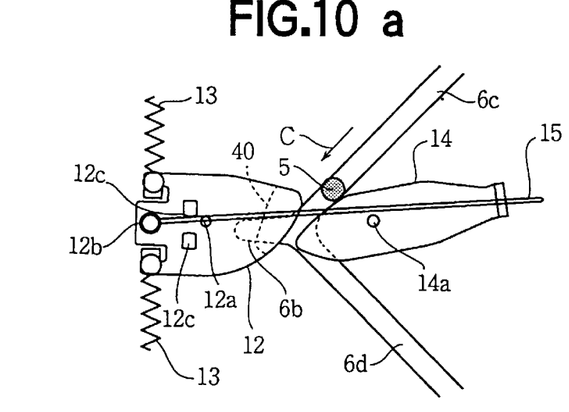
FIGS. 10a to 10d are illustrations showing the operation of the changeover device when releasing a jam of the disc player.

The automotive CD changer is liable to be subjected to an unexpected external shock so that the three pins 5a, 5b and 5c of the disc player 4 may stop at different vertical positions, resulting in a jam. For example, as shown in FIGS. 10a and 10b, while one of the pins 5 is in the upper diagonal slit 6c, another 5 may be positioned in the lower diagonal slit 6d. FIGS. 10a to 10d describe a procedure for releasing the jam.

When the loading motor 8 is driven in the direction to move the elevation plate 6 to the left, the pin 5 in FIG. 10a is urged to slide upward in the upper slit 6c, and the pin 5 in FIG. 10b is urged to slide downward in the lower slit 6d. However, the disc player 4 inhibits such a movement. Therefore the pins 5 can get stuck, rendering the disc player 4 immovable, and a significant load is exerted on the loading motor 8. On the other hand, the moving of the pin 5 in FIG. 10a in the upper slit 6c in a direction C, and the moving of the pin 5 in the lower slit 6d in a direction D are possible. Therefore, the controller detects the increased load and operates the motor 8 to be driven in the opposite direction so that the elevation plate is moved to the right. Both pins 5 are thus introduced into the respective siding slits 6b.

Each of the pins 5 pushes the front cam surface 40a of the cam 40 formed on the control lever 12, thereby rotating the control lever 12 in the counterclockwise direction. When the pin 5 is further moved, passing through the position o in the siding slit 6b, the control lever 12 is further rotated to a dash-dotted position in FIG. 10c. The pin 5 is therefore able to pass through a space formed under the cam 40 and proceeds inward to the innermost position of the siding slit 6b, namely the reset position a in FIG. 6. At that position, the control lever 12, no longer urged by the pin 5, returns to the initial neutral position as shown by a solid line in FIG. 10c by the springs 13. The controller detects that all of the pins 5 are in the respective reset positions a by detecting the load on the motor 8, and operates the loading motor 8 to be driven in the opposite direction as before.

Accordingly, each pin 5 is relatively moved to the right in FIG. 10d, and abuts against the rear cam surface 40b of the cam 40. When the pin 5 is further moved, the control lever 12 is clockwisely rotated in a direction B. The actuating lever 15 is accordingly rotated about the shaft 12b in the clockwise direction so as to abut on the upper stopper 12c. Therefore, the end 14c of the changeover lever 14 is positioned to close the entrance of the upper diagonal slit 6c. When the pin 5 is further moved to the right, the control lever 12 is further rotated while distorting the actuating lever 15. Therefore, control lever 12 is out of the siding slit 6b so that the pin 5 is able to slide toward the junction. The pin 5 is thereafter introduced into the lower slit 6d. Thereafter, the pins 5 smoothly descend along the lower slit 6d in the direction E. Each pin 5 can be moved to the magazine ejecting position b in FIG. 6 so that there is no possibility of the magazine 22 getting stuck in the automatic CD changer due to the accident.

In the present embodiment, the actuating lever 15 is a resiliently flexible wire capable of distortion when the control lever 12 is rotated by a significant amount. Therefore, a pair of stoppers 6e are provided on the elevation plates 6 and 6A as shown in FIGS. 10c and 10d to restrict the rotation of the changeover lever 14. However, the actuating lever 15 may be a rigid member, provided the configurations and the sizes of the control lever 12 and the changeover lever 14, and the distance between the stoppers 12c are appropriately determined.

From the foregoing it will be understood that the present invention provides a disc player carrier for an automatic CD changer which enables the number of the discs stored in the CD changer to be increased without increasing the moving distance of the carrier, and therefore without increasing the size of the disc changer. Thus, the space necessary for mounting the CD changer is not increased. Moreover, the carrier has a simple construction so that the manufacturing cost can be restrained.

While the invention has been described in conjunction with preferred specific embodiment thereof, it will be understood that this description is intended to illustrate and not limit the scope of the invention, which is defined by the following claims.

We claim:

1. An apparatus for playing a recording medium, in which a plurality of recording media are arranged in a first direction, said apparatus comprising:
   a player for reproducing information from the recording medium;
   carrying means for carrying the player in the first direction, having a V-shaped guide slit with which the player is engaged, axis of axial symmetry of a V-shape formed by the V-shaped guide slit being disposed in a second direction;
   driving means for moving the carrying means in the second direction which is perpendicular to the first direction, so that the player moves along the V-shaped guide slit;
   wherein the V-shaped guide slit has an upper diagonal slit and a lower diagonal slit, a portion of the upper diagonal slit and a portion of the lower diagonal slit forming the V-shape, the portion of the upper diagonal slit and the portion of the lower diagonal slit extending straight in a range corresponding to a plurality of recording media arranged in the first direction, said range encompassing at least all of the recording media accessible by said player.

2. The apparatus according to claim 1, wherein when an engaging portion of the player engaging with the guide slit relatively moves over a joint of the V-shaped guide slit, the moving direction of the guide slit after the joint is opposite to the moving direction of the guide slit before the joint.

3. The apparatus according to claim 2, wherein a siding is provided, which is continuously branched from the joint and has a range with which the engaging portion of the player can be engaged.

4. The apparatus according to claim 3, wherein a changing means is provided corresponding to the siding and the guide slit, the changing means being adapted to temporarily induce the engaging portion of the player into the siding when moving the engaging portion over the joint of the V-shaped guide slit.

5. The apparatus according to claim 4, wherein the changing means has a changeover lever provided adjacent the joint of the guide slit, along the first direction, which is rotatably composed in a range between a first engaging position and a second engaging position, a control lever rotatable at a predetermined position adjacent the siding and resiliently held at a position near an end thereof, and an actuating lever engaged with a position near an end of the changeover lever with a play,
   wherein the changeover lever, when the engaging portion is positioned in the guide slit and the carrying means moves, is rotated by the pushing of the engaging portion, and engages the changeover lever at the first position or the second position, thereby inducing the engaging portion into the siding, and
   wherein the control lever, when the engaging portion is positioned in the siding and the carrying means moves so as to cause the engaging portion to approach the joint of the guide slit corresponding the siding, is rotated by the pushing of the engaging portion, and engages the changeover lever at the first position or the second position, thereby inducing the engaging portion into a half part of the guide slit or another half part bordering the joint, cooperating with the actuating lever.

6. The apparatus according to claim 5, wherein the control lever has a cam, when the engaging portion contacts with the cam in a changing region of the siding, by the operation that the carrying means moves to cause the engaging portion to approach the joint corresponding to the siding, the control lever is rotated by the pushing of the engaging portion, thereby engaging the changeover lever at the first position or the second position, cooperating with the actuating lever mounted on the control lever.

7. The apparatus according to claim 5, wherein detecting means is provided for detecting the fact that the engaging portion of the player is positioned near the joint of the V-shaped guide slit when the engaging portion of the guide relatively move over the joint, the moving direction of the guide is changed by the detecting means.

8. The apparatus according to claim 3, wherein the guide slit is provided in plural, the engaging portion engages with each guide slit, the siding having a reset region for moving the engaging portion to a desired direction of the guide slit in a same inducing direction.

9. The apparatus according to claim 8, wherein the siding is a siding slit continuously branched from the joint of the guide slit, and having a region with which the engaging portion can be engaged.

10. The apparatus according to claim 2, wherein the carrying means is composed by a plate, the guide slit formed in the plate, and wherein the engaging portion of the player, engaged with the slit is an engaging pin.

11. The apparatus according to claim 10, further comprising a siding which is continuously branched from the joint and has a region with which the engaging portion of the player can be engaged, and a changing means corresponding to the siding and the guide slit, the changing means being adapted to temporarily induce the engaging portion of the player into the siding when moving the engaging portion over the joint of the V-shaped guide slit, said changing means comprising a means for inducing the engaging portion into the siding by engaging with the engaging portion when the engaging portion is located in the guide slit and the carrying means moves, and for causing that the engaging portion enters the guide slit and moving along the guide slit by the operation that the carrying means moves so as to cause the engaging portion to approach the joint of the guide slit when the engaging portion is in the siding.

12. An apparatus according to claim 1, wherein the V-shaped guide slit is a single V-shaped guide slit extending in a full range within which the player moves in the first direction.

13. A device for carrying a disc player in an automatic disc changer having a casing with a pair of vertical side walls and a bottom plate, and a plurality of vertically arranged optical discs, said device comprising:

the disc player having at least two pins projected from opposite sides, respectively;

a pair of elevation plates horizontally slidably mounted on the vertical side walls, respectively;

each of the elevation plates having a V-shaped guide slit, axis of axial symmetry of a V-shape formed by the V-shaped guide slit being horizontally disposed, wherein the V-shaped guide slit comprises an upper diagonal slit and a lower diagonal slit, with a portion of the upper diagonal slit and a portion of the lower diagonal slit forming the V-shape, the portion of the upper diagonal slit and the portion of the lower diagonal slit extending straight in a range corresponding to the plurality of vertically arranged optical discs; said range encompassing at least all of the vertically arranged optical discs accessible by said disc player;

each of the pins being slidably engaged with the V-shaped guide slit;

driving means for driving the elevation plates in a horizontal direction which is changed to an opposite direction at a joint between the upper diagonal slit and the lower diagonal slit, so as to move each of the pins along the V-shaped guide slit, whereby the disc player is carried to a position corresponding to an optical disc.

14. The device according to claim 13 further comprising:

each of the side walls having a vertical guide slit, each of the pins being slidably engaged with the vertical guide slit.

15. The device according to claim 13 wherein one of the V-shaped guide slits is disposed so that the V-shape is oriented in an opposite direction to the direction of the other V-shape, and the elevation plates are driven in opposite directions by the driving means.

16. The device according to claim 13 further comprising a siding slit formed in each of the elevation plates at the joint of the V-shaped guide slit so as to be communicated with the guide slit, the siding slit being extended in an opposite horizontal direction to the axis of the axial symmetry of the V-shaped guide slit.

17. The device according to claim 16 further comprising changeover means provided at positions adjacent to the joint of the V-shaped guide slit.

18. The device according to claim 17 wherein the changeover means comprises a control lever and a changeover lever which are rotatably mounted on each of the elevation plates, respectively, and an actuating lever pivotally mounted on the control lever and engaged with the changeover lever, the control lever is pivoted by the pin so that the actuating lever is pivoted, thereby pivoting the changeover lever so as to close an entrance of the upper or lower diagonal slit which the pin has passed.

19. The device according to claim 18 wherein the control lever is positioned outside the V-shaped guide slit, and the changeover lever is positioned on the axis of the axial symmetry.

20. The device according to claim 19, further comprising a pair of springs for keeping the control lever at a neutral position.

21. The device according to claim 20, further comprising a pair of stopper pins provided on the control lever at opposite sides of the actuating lever.

22. The device according to claim 21, wherein the actuating lever is pivotally mounted on the control lever at a base end thereof, and engaged with the changeover lever at an innermost position of the changeover lever.

23. The device according to claim 22, wherein the stopper pins are provided such that the actuating lever rotates the changeover lever to a position where the entrance of the upper or lower diagonal slit into which the pin enters is opened when the control lever is rotated by the pin, and to a position where the entrance of the slit is closed when the control lever is rotated to the neutral position by the springs.

24. The device according to claim 23, wherein the control lever has a cam to be abutted against the pin so as to be rotated by the pin.

25. The device according to claim 24, wherein the siding slit has a reset position at an innermost position, when the pin reaches the reset position, the control lever returns to the neutral position.

26. The device according to claim 25, wherein the cam of the control lever has a rear cam surface, so that the control lever is rotated by the returning pin to a predetermined position to introduce the returning pin to one of the diagonal slits.

* * * * *